United States Patent [19]

Sugiura

[11] Patent Number: 4,641,758
[45] Date of Patent: Feb. 10, 1987

[54] BLOW-MOLDED BOTTLE-SHAPED CONTAINER OF BIAXIALLY ORIENTED THERMOPLASTIC SYNTHETIC RESIN WITH WIDE PORT AND METHOD OF MOLDING THE SAME

[75] Inventor: Hiroaki Sugiura, Tokyo, Japan

[73] Assignee: Yoshino Kogyosho Co., Ltd., Tokyo, Japan

[21] Appl. No.: 672,670

[22] Filed: Nov. 19, 1984

[30] Foreign Application Priority Data

| Nov. 22, 1983 | [JP] | Japan | 58-220241 |
| Nov. 22, 1983 | [JP] | Japan | 58-180526[U] |
| Nov. 22, 1983 | [JP] | Japan | 58-180527[U] |
| Dec. 15, 1983 | [JP] | Japan | 58-236890 |
| Dec. 15, 1983 | [JP] | Japan | 58-193131[U] |
| Dec. 28, 1983 | [JP] | Japan | 58-249915 |
| Feb. 6, 1984 | [JP] | Japan | 59-19694 |

[51] Int. Cl.$^4$ .................................. B65D 23/00
[52] U.S. Cl. ........................................ 215/1 C
[58] Field of Search ............................ 215/1 C

[56] References Cited

U.S. PATENT DOCUMENTS

| 3,536,500 | 10/1970 | Cleereman et al. | 215/1 C |
| 3,719,735 | 3/1973 | Valyi | 215/1 C |
| 3,843,005 | 10/1974 | Uhlig | 215/1 C |
| 3,934,743 | 1/1976 | McChesney et al. | 215/1 C |
| 4,170,622 | 10/1979 | Uhlig | 215/1 C |
| 4,261,473 | 4/1981 | Yamada et al. | 215/1 C |

Primary Examiner—Joseph Man-Fu Moy
Attorney, Agent, or Firm—Parkhurst & Oliff

[57] ABSTRACT

A blow-molded bottle-shaped container of biaxially oriented thermoplastic synthetic resin which comprises a cylindrical neck portion of a thick short cylindrical shape formed between a neck edge portion formed in a curved surface improved for openability of a cap on the outer lower peripheral surface thereof and in a curved surface improved for the sealability to the packing of the cap on the upper surface thereof and a thin bottomed cylindrical body formed by biaxial orientation blow molding, said neck edge portion being formed in the state of obliquely outwardly upwardly from said cylindrical neck portion, said body integrated in the state of abruptly bending and swelling outwardly from the lower central port of said cylindrical neck portion. Thus, the bottle-shaped container can prevent the dimensions of the surface of the neck edge portion by the pressure and heat acted on the container body from varying by disposing the cylindrical neck portion for preventing the transmission of a stress and deforming force from the body to the neck edge portion between the blow-molded body of biaxially oriented resin and the neck edge portion to be associated with a cap.

2 Claims, 21 Drawing Figures

BLOW-MOLDED BOTTLE-SHAPED CONTAINER OF BIAXIALLY ORIENTED THERMOPLASTIC SYNTHETIC RESIN WITH WIDE PORT AND METHOD OF MOLDING THE SAME

BACKGROUND OF THE INVENTION

This invention relates to a blow-molded bottle-shaped container of biaxially oriented thermoplastic synthetic resin and a method of molding the same.

As the physical properties of a synthetic resin material and the molding technique of using the synthetic resin material have been advanced, a bottle-shaped container with a wide port closed by a caulked cap such as neocap made of aluminum is being molded by the synthetic resin material.

Since the bottle-shaped container with a wide port of this type is almost without exception used for containing drinking liquids and foodstuffs such as jams, filling of the drinking liquid in the bottle-shaped container is executed by heating filling and pressurizing filling.

Further, since the content liquid is filled by heating or pressurizing in the bottle-shaped container and the container is sealed, the container body itself must have sufficiently large mechanical strength. Thus, it is necessary to mold the bottle-shaped container with a wide port by a method of biaxially orientation blow-molding by the use of a polyethylene terephthalate resin.

A bottle-shaped container with a wide port which has sufficiently high mechanical strength can be provided by a method of biaxially orientation blow-molding the polyethylene terephthalate resin as described above. However, the blow-molded bottle-shaped container of biaxially oriented resin is biaxially orientation-molded only at the container body, but the neck edge portion to be associated with a caulked cap of the bottle-shaped container remains in the shape of the preformed primary injection-molded piece as the final shape as it is. Therefore, it is required to mold the preformed primary injection moded piece in high dimensional accuracy and so as to have sufficiently high mechanical rigidity.

In order to increase the mechanical rigidity of the neck edge portion, the thickness of the neck edge portion of the bottle-shaped container may be merely increased. However, it is very difficult to accurately hold the dimensional accuracy of the neck edge portion of the bottle-shaped container until the molding of the bottle-shaped container is completed.

Figure 2:
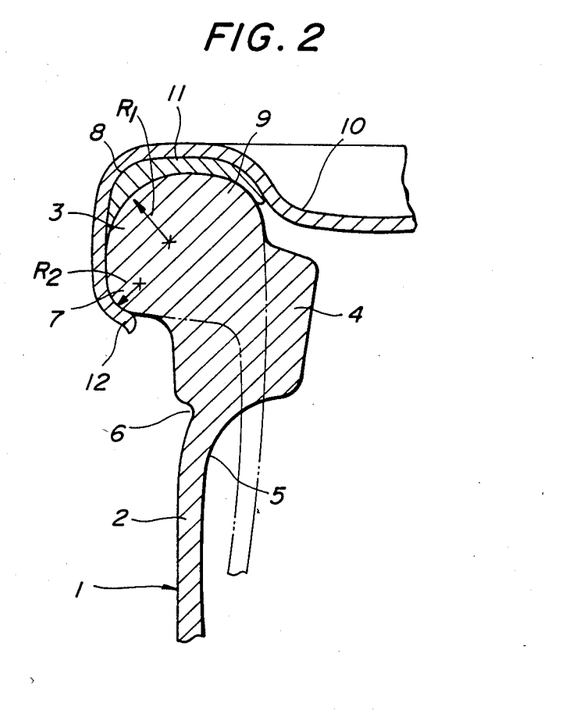
FIG. 2 is an enlarged longitudinal sectional view of the essential part of a conventional bottle-shaped container with a wide port.

More particularly, a conventional bottle-shaped container with a wide port of synthetic resin of this type has, as shown by hatched lines in FIG. 2, a structure that a container body 2 which is reduced in thickness is integrally formed by biaxial blow-molding directly from a thick neck edge portion 3. Therefore, it cannot accurately hold the dimensional accuracy of the surface of the neck edge portion 3 due to the variation in the radius ($R_1$) of curvature of the lower surface 7 of the neck edge portion 3 and in the radius ($R_3$) of curvature of the rear upper surface 9 owing to the flowing phenomenon from the body 2 side at the blow-molding time upon thermal influence of the heat to the body 2 at the biaxial-orientation blow-molding time of the preformed primary-piece of the bottle-shaped container.

Further, when the body 2 which is biaxially orientation blow-molded in reduced thickness is integrated directly with the neck edge portion 3 as described above, the pressure and the heat acted on the body 2 affect to the neck edge portion 3 of the bottle-shaped container, thereby causing the size of the radius of curvature of the above-described surface part of the neck edge portion 3 to vary, with the result that the dimensional accuracy of the neck edge portion 3 becomes unstable.

The radius of curvature of the surface part of the neck edge portion 3 seriously affects the association of a cap 10 with the neck edge portion 3 for sealing the bottle-shaped container 1 with a wide port, and the radius ($R_1$) of curvature of the lower surface 7 of the neck edge portion 3 is directly related to improved openability of the cap 10. Similarly, the upper surface, i.e., the radius ($R_2$) of curvature of the front upper surface 8 and the radius ($R_3$) of curvature of the rear upper surface 9 of the neck edge portion relate to improved sealability between the neck edge portion and the packing 11 of the cap 10. It is necessary to accurately hold the dimensions of the radii of curvature of the front and rear upper surfaces of the neck edge portion to the set value at the time of molding the preformed piece of primary injection-molded shape.

However, since the values of the radii of curvature of the front and rear upper surfaces of the neck edge portion in the conventional blow-molded bottle-shaped container with a wide port of biaxially oriented synthetic resin, cannot be held stable, opening of the cap 10 becomes difficult, the closing retentivity of the bottle-shaped container 1 by the cap 10, on the other hand, becomes insufficient, or the sealing effect of the packing 11 associated with the cap 10 is not sufficient, with the result that the quality of the content liquid in the bottle-shaped container is disadvantageously deteriorated, or varied.

SUMMARY OF THE INVENTION

Accordingly, it is an object of the present invention to provided a blow-molded bottle-shaped container of biaxially oriented thermoplastic synthetic resin with a wide port which can eliminate the aforementioned drawbacks and disadvantages and prevent variations in the dimensions of the surface of the neck edge portion caused by the pressure and heat acting on the container body by disposing a cylindrical neck portion having sufficiently large thickness for preventing the transmission of a stress and deforming force from the body to the neck edge portion between the blow-molded body of biaxially oriented resin and the neck edge portion to be associated with a cap.

The foregoing objects and other objects as well as the characteristic features of the invention will become more fully apparent and more readily understandable by the following description and the appended claims when read in connection with the accompanying drawings.

BRIEF DESCRIPTION OF THE DRAWINGS

FIGS. 3 through 5 show a primary preformed piece of injection molded shape for forming the bottle-shaped container with a wide port;

FIGS. 6 and 7 are views showing other examples of the primary preformed piece;

FIGS. 13 through 18 are explanatory views of a method of heating the primary preformed piece;

FIGS. 19 through 21 show molding machines for molding a bottle-shaped container from the primary preformed piece;

DESCRIPTION OF THE PREFERRED EMBODIMENTS

Embodiments of the present invention will be described in detail with reference to the accompanying drawings.

Figure 1:
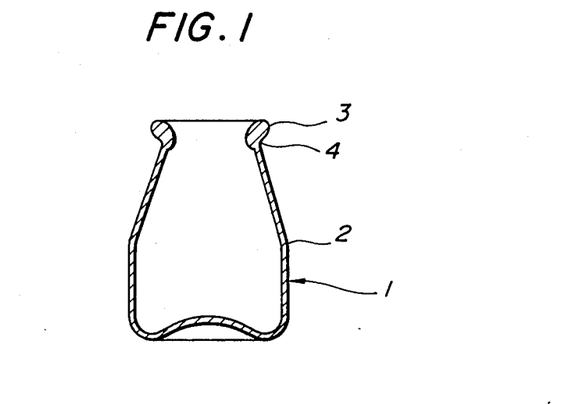
FIG. 1 is a longitudinal sectional view of a bottle-shaped container with a wide port.

A neck portion of a bottle-shaped container 1 with a wide port which is blow-molded of biaxially oriented thermoplastic synthetic resin of the present invention has a cylindrical neck portion 4 of thick short cylindrical shape between a neck edge portion 3 formed in a curved surface having a radius ($R_2$) of curvature which improves openability of a cap on the outer lower peripheral surface 7 and formed in a curved surface having a radius of curvature $R_1$ which improves sealability to the packing 11 of a cap 10 on the upper surface and a container body 2 formed in cylindrical shape and thinly in thickness with a bottom by biaxial orientation blow-molding, and formed in a structure that the neck edge portion 3 is formed at the cylindrical neck portion 4 in the obliquely outwardly upwardly projected state and the body 2 is integrated in the abruptly bent and swelled state from the lower center to the outward direction of the cylindrical neck portion 4.

More particularly, the molding size of the neck edge portion 3 is structured to effectively prevent variances due to the biaxial orientation blow-molding of the body 2 or thermal filling or filling under pressure of content liquid in the body 2. Specifically, a lower surface 7 having a radius ($R_2$) of curvature set so that a curved peripheral edge 12 of the cap 10 made of metal such as, for example, aluminum can be rigidly engaged is provided. Moreover, a neck edge portion 3 having a curved surface shape formed such that the packing 11, adhered to the cap 10 to obtain strong sealability between the cap 10 and the bottle-shaped container 1, can be more closely contacted is provided. Additionally, and a cylindrical neck portion 4 having a thickness capable of providing sufficient rigidity to prevent transmission of deforming stresses effected at the time of biaxial orientation blow-molding the body 2 and deforming stresses corresponding to a force from the exterior effected at the time of thermally filling content liquid or filling under pressure are not transmitted.

In the embodiment shown, the body 2 is drooped while being bent outwardly from the portion near the outside edge of the lower end of the cylindrical neck portion 4, a recess 6 is formed at the peripheral groove shape on the boundary portion of the outer peripheral surface between the cylindrical neck portion 4 and the body 2, and the inner peripheral surface 5 of the upper end of the body as the connecting portion to the cylindrical neck portion 4 is curved in a large radius of curvature.

The structure of the connecting portion of the body 2 to the cylindrical neck portion 4, i.e., the upper end of the body is very important, and becomes as described when the upper end of the body 2 is formed upon applying of sufficient orientation thereto.

More particularly, the body 2 before the biaxial orientation blow-molding is disposed substantially from the center on the lower surface of the cylindrical neck portion 4 in drooping state. When only the body 2 is oriented from this shape, the upper end of the body 2 is extremely strongly oriented and deformed to the cylindrical neck portion 4 which is not oriented or deformed. Thus, even the body 2 in the vicinity of the cylindrical neck portion 4 can be sufficiently oriented.

When the upper end of the body 2 is oriented and deformed, a strong deforming force acts on the cylindrical neck portion 4, but since the cylindrical neck portion 4 is molded in a structure capable of enduring the external force as described above, the force from the body 2 side at the orientation molding time is blocked by the cylindrical neck portion 4, and is not transmitted to the neck edge portion 3 at all.

Similarly, when content liquid is thermally filled, deforming force is created at the body 2 by this heating, but this force is not transmitted to the neck edge portion 3 by the cylindrical neck portion 4.

According to the present invention as described above, the neck portion of the bottle-shaped container with a wide port can block the transmission of all external forces to the neck edge portion from the body side of the bottle-shaped container, and the blocking action of transmitting the external forces operates irrespective of the time of molding the bottle-shaped container, the time of filling content after the molding and the using time. Therefore, the mechanical strength of the neck edge portion to be associated with the cap for opening and closing the bottle-shaped container can be sufficiently increased, and unnecessary external forces are blocked to reliably prevent the deformation of the neck edge portion. Consequently, extremely high dimensional accuracy of the neck edge portion can be maintained, and when the dimensional accuracy of the neck edge portion is maintained preferably, high sealability of the cap can be obtained, and preferable openability of the cap can be executed.

Figures 3, 4, 5:
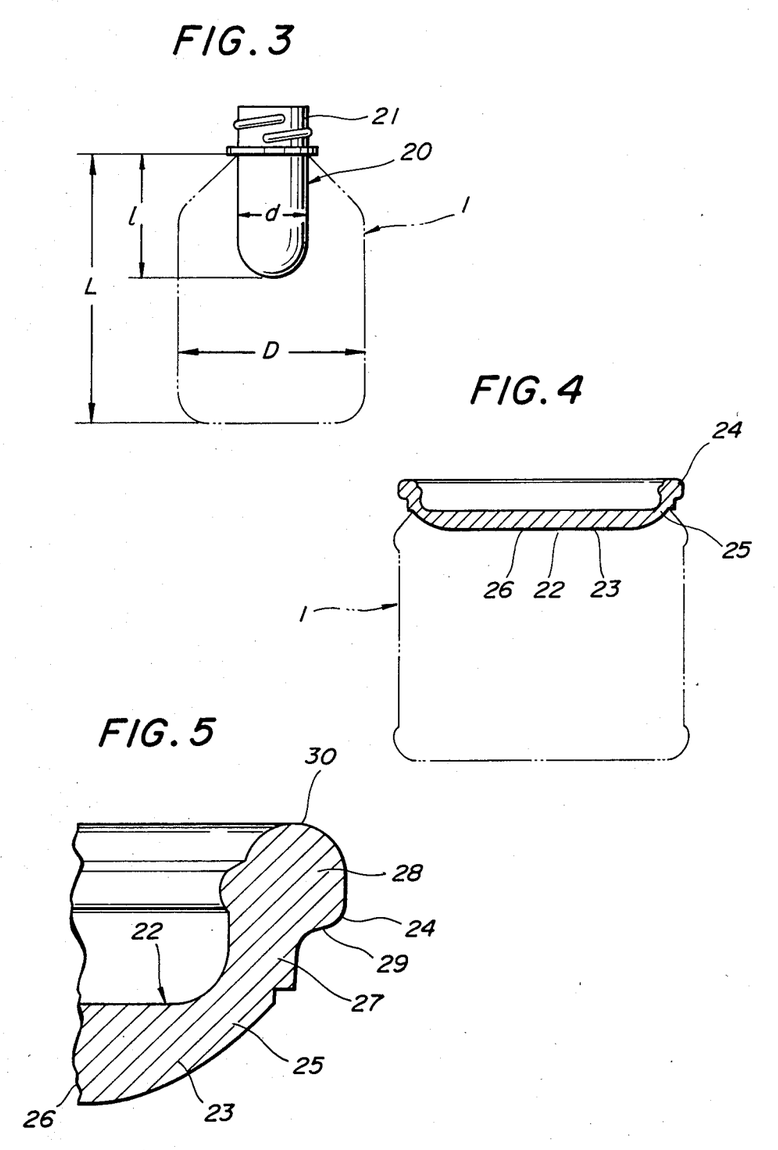
FIG. 3 is a view showing the conventional primary preformed piece.
FIG. 4 is a view showing the primary preformed piece of the invention.
FIG. 5 is a partially enlarged sectional view of the preformed piece.

FIGS. 3, 4 and 5 show a primary preformed piece for molding the bottle-shaped container.

A conventional blow-molding of biaxial orientation carries out blowing an injection molded primary preformed piece of bottomed cylindrical shape of thermoplastic synthetic resin while axially and radially orienting the primary preformed piece. As shown in FIG. 3, the orientation magnification of the primary preformed piece 20 to the bottle-shaped container 10 is approx. twice at the ratio of the axial length L of the bottle-shaped container 10 to the axial length l of the primary preformed piece 20, and approx. 2 to 2.5 times at the ratio of the diameter D of the bottle-shaped container 10 to the diameter d of the primary preformed piece 20.

More particularly, the conventional biaxial orientation blow molding can sufficiently orient the primary preformed piece 20 in axial and radial directions so as to enhance the physical properties and the strength of the molded bottle-shaped container.

However, the neck portion 21 of the primary preformed piece 20 is a portion to be fixed to a mold, and is not entirely oriented. Therefore, even after the preformed piece is blow-molded into the bottle-shaped container 10, the neck portion 21 remains in the same shape as in the preformed piece and becomes the same shape at the neck portion 21 of the bottle-shaped container 10.

The bottle-shaped container 10 of such shape can perform sufficient functions as a container for containing, for example, liquid, but is evidently not proper as a container for containing foodstuffs such as jam.

In FIG. 4, reference numeral 22 designates a primary preformed piece of the present invention, which is a thin tray shape injection molded from thermoplastic synthetic resin such as polyethylene terephthalate resin, and having a short cylindrical neck portion 24 formed integrally at the peripheral edge of the disc-shaped body portion 23.

This body portion 23 becomes the body, including the bottom, of the bottle-shaped container 10 after blow-molding. The peripheral end 25 of the body portion 23 is gradually reduced in thickness from the center toward the peripheral edge, and increased in thickness at the central portion 26.

As shown in FIG. 5, the cylindrical neck portion 24 is construcred integrally in the state that a neck edge portion 28 is projected obliquely above the thick short cylindrical neck portion 27, and the neck edge portion 28 is provided with an outer lower peripheral curved surface 29 dimensioned to enhance openability of the cap and an upper curved surface 30 dimensioned enhanced sealability to the packing (not shown) of a caulked cap.

The primary preformed piece 22 constructed as described above is associated in a heated predetermined mold, and is blow-molded by biaxial orientation. In this case, an orienting pin is first contacted with the center of the body portion 23 of the primary preformed piece 22, the body portion 23 is axially oriented until becoming the magnification of more than then times of the depth width l of the primary preformed piece 20, and is thereafter radially oriented until becoming substantially the same diameter D as the diameter d of the cylindrical neck portion 24 of the primary preformed piece 20 to form a bottomed cylinder and molded as a bottle-shaped container 10.

A bottle-shaped container with a wide port having the diameter of a cylindrical neck portion 24 substantially the same as that of the body of the bottle-shaped container 10 can be provided by employing the molding means constructed as described above. The bottle-shaped container 10 blow-molded from the primary preformed piece constructed as described above can obtain strong mechanical strength along the axial direction by high magnification orientation molding in in the axial direction. Further, the body portion 23 for molding the body including the bottom of the bottle-shaped container 10 is formed to be substantially flat. Accordingly, it is necessary that to considerably radially orient the body portion 23 of the primary preformed piece to mold it in a cylindrical shape. To this end, the radial orienting amount of the preformed piece can be increased beyond the apparent amount. It is preferable to form the flat sectional shape of the body portion so as to increase the radial mechanical strength.

The central portion 26 of the body portion 23 of the primary preformed piece is effected by large orienting force by the orienting pin particularly at the time of axially orienting the preformed piece as described above. This central portion 26 is formed in sufficiently large thickness by considering this point. If the radial orienting magnification is approx. 1 as described above, the orientation of the upper end of the bottle-shaped container 10 to be molded might become insufficient, but the peripheral end 25 of the body portion 23 of the primary preformed piece 1 corresponding to the upper end of the blow-molded bottle-shaped container 10 becones thin. Therefore, the body portion can be readily oriented, and considered so as not to cause the above-described drawback.

Further, since the orienting force might effect the cylindrical neck portion 24 at the time of orienting the body portion 23, the primary preformed piece 22, is formed with a thick short cylindrical neck portion 27 is disposed at the lower position of the neck edge portion 28. Thus the orienting force is not transmitted via the cylindrical neck portion 27 to the neck edge portion 28, and the openability and the sealability of the caulked cap can be accordingly provided.

More particularly, since the radial orientation is slight, the diameter of the body of the bottle-shaped container 10 thus molded is substantially the same as that of the cylindrical neck portion 24. Accordingly, a bottle-shaped container with a wide port of desired size can be provided. Since the radial orientation is small, but the molded bottle-shaped container 1 is sufficiently oriented axially and formed in a cylindrical shape, the bottle-shaped container having sufficiently large strength can be provided.

The primary preformed piece 22 used in the above-described molding means is constructed to be integrally formed with the cylindrical neck portion 24 at the peripheral edge of the body portion 23 of the disc shape. The body portion 23 becomes a body, including the bottom of the bottle-shaped container 10. The body portion 23 is reduced in thickness at the peripheral end 25 and increased in thickness at the central portion 26. Accordingly, the strength of the central portion 26 which is effected by large axial orienting force at the orientation-molding time can be provided. Further, the radial orientation is small, and the orientation of the peripheral end 25 which is hardly oriented can be effectively executed. Moreover, even if the body portion 23 is oriented, the neck edge portion 28 strongly required for the dimensional accuracy at the cylindrical neck portion 24 has a thick short cylindrical neck portion 27, and is not accordingly deformed, thereby molding an excellent bottle-shaped container with a wide port.

Figure 6:
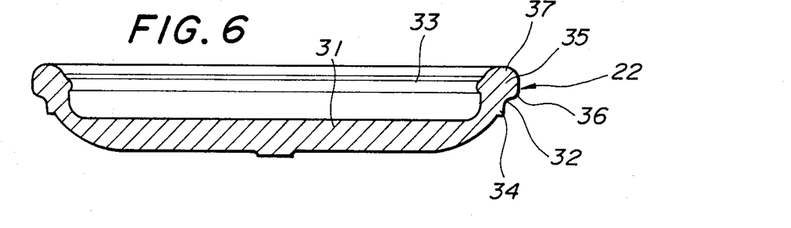
FIG. 6 is a sectional view of the preformed piece.
Figure 7:
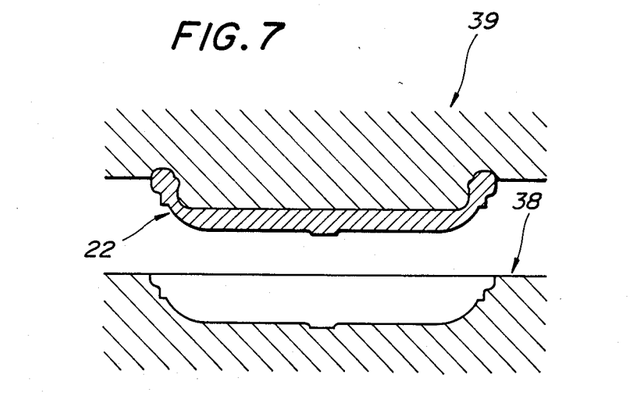
FIG. 7 is a sectional view showing a mold after molding the preformed piece.

FIGS. 6 and 7 show other example of a primary preformed piece to be blow-molded into a bottle-shaped container of the invention.

As shown in FIG. 6, a primary preformed piece 22 has a thin tray shape integrally formed with a short cylindrical neck portion 32 at the peripheral edge of a body portion 31 of a disc shape, and is constructed to have a peripheral strip 33 by the slightly projecting width substantially at the center of the inner peripheral surface of the cylindrical neck portion 32.

The cylindrical neck portion 32 is constructed integrally with a neck edge portion 35 in the state obliquely outwardly upwardly projected at the thick short cylindrical neck portion 34, and the neck edge portion 35 is further formed in a curved surface improved for the openability of a caulked cap (not shown) associated after molded as a bottle-shaped container at the outer lower peripheral surface 36 and in a curved surface improved for the sealability to the packing of the caulked cap at the upper surface 37.

In the embodiment described above, the thick short cylindrical neck portion 34 of the short cylindrical neck portion 32 is formed in a predetermined thickness. Therefore, the orienting force does not affect to the neck edge portion 35 even when orienting the body portion 31, but the shape of the neck edge portion 35 can be obtained. Further, the peripheral strip 33 is formed on the inner peripheral surface of the cylindrical neck portion 32. Accordingly, the rigidity of the cylindrical neck portion 32 is further increased, and the cylindrical neck portion 32 is neither deformed nor strained at the time of orientation blow-molding or in case of filling content after molding as a bottle-shaped container.

FIG. 7 shows a primary preformed piece 22 of the above structure, injection molded and removed from the mold.

After the primary preformed piece 22 is injection molded, a cavity 38 of the mold is axially moved to remove the preformed piece. The primary preformed piece 22 is engaged lightly at the peripheral strip 33 slightly projected inwardly with a core 39, and is not adhered at the cavity 38 side, and the preformed piece 22 is smoothly removed from the cavity 38 of the mold.

After the preformed piece 22 is removed from the cavity 38 of the mold, the engagement of the core 39 with the peripheral strip 33 is forcibly released by projecting an ejector pin in the core 39, thereby removing the primary preformed piece 22 from the core 39.

Therefore, the projecting width of the peripheral strip 33 is set to the degree capable of engaging the primary preformed piece 22 with the core 39 side at the time of releasing the piece 22 from the cavity 38 of the mold and simply releasing the piece 22 from the core 39 by the ejector pin at the mold releasing time.

As apparent from the above description, the primary preformed piece 22 of the invention is in the thin tray shape, and the peripheral strip 33 is formed on the inner peripheral surface of the short cylindrical neck portion 32.

Therefore, the bottle-shaped container with a wide port can be simply blow-molded by biaxial orientation, and the strength of the short cylindrical neck portion 32 can be obtained by the peripheral strip 33. Thus, the cylindrical neck portion 32 is not deformed at the time of molding or filling, and even when the caulked cap is associated with the cylindrical neck portion 32 after molding as the bottle-shaped container, the sealability and the openability of the cap can be improved.

Further, when the primary preformed piece 22 is injection molded, the peripheral strip 33 is lightly engaged partly with the core 39. Accordingly, the preformed piece 22 is not adhered to the cavity 38 side of the mold at the time of removing the preformed piece 22 from the cavity, but can be effectively and accurately removed from the mold.

Figure 8:
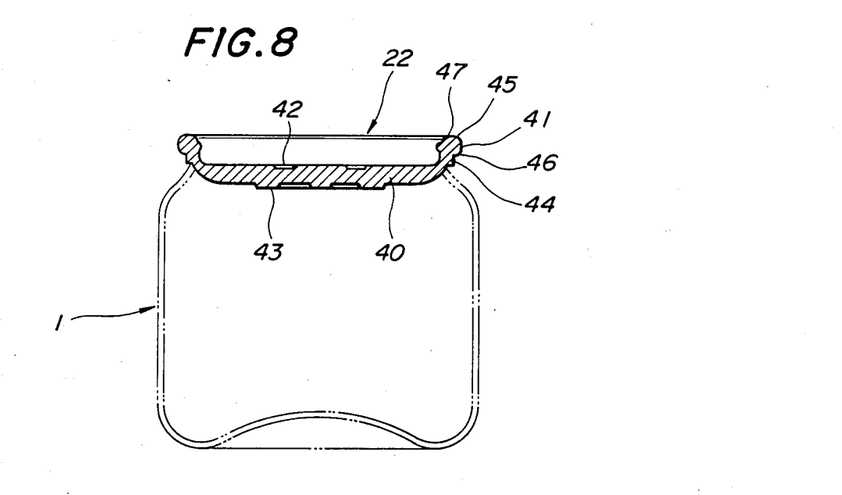
FIG. 8 is a sectional view showing still another example of the preformed piece.

FIG. 8 shows still another example of a primary preformed piece for molding a bottle-shaped container of the invention.

As shown in FIG. 8, a primary preformed piece 22 is formed in a thin tray shape integrated with a short cylindrical neck portion 41 at the peripheral edge of a body portion 40 of a disc shape to become a body including a bottom of a blow-molded bottle-shaped container, a ring-shaped recess groove 42 is formed at the periphery at the center of the body portion 40 as a center on a predetermined position on the inner surface of the body portion 40, and a projecting strip 43 is similarly formed on the outer surface of the body portion 40.

Conversely, it is noted that the recess groove 42 may be formed on the outer surface of the body portion 40 and the projecting strip 42 may be formed on the inner surface of the body portion 40. Further, the recess groove may not always be formed at the center of the body portion 40 as a center, but may be swelled or submerged to form a pattern of a predetermined mark at a part of the body portion 40. Thus, an uneven surface is formed on the body portion 40 by the formation of the recess groove 42, the projecting strip 43 and the pattern, and thick portions and thin portions are presented in this matter.

Since the primary preformed piece 22 is blow-molded by a biaxial orientation, the entire body portion 40 except the short cylindrical neck portion 41 is sufficiently oriented to mold a bottle-shaped container 1 with a wide port along a blowing mold. When a predetermined position of the primary preformed piece 22 corresponding to a predetermined position such as a lower end of a bottle-shaped container 1 which tends to reduce in thickness particularly upon orienting strongly is increased in thickness by arranging, for example, a projecting strip 43 having a width in this case, the bottle-shaped conainter 1 after blow-molding is molded in a uniform thickness while being sufficiently oriented, thereby obtaining mechanical strength.

When a mark pattern is formed on the primary preformed piece 22, a thick portion (or a thin portion) to be formed at the bottle-shaped container 1 is presented in a pattern shape after the blow-molding, and the pattern can be visually observed from the exterior. However, in order to obtain such an external appearance effect, it is necessary to use a material which has excellent transparency such as polyethylene terephthalate resin as the thermoplastic synthetic resin.

The short cylindrical neck portion 41 is constructed integrally with a curved neck edge portion 45 obliquely upwardly projecting from a thick short cylindrical neck portion 44. The neck edge portion 45 is curved at a radius designed to enhance openability of a caulked cap (not shown) placed on the container after molding. The outer lower peripheral end surface 46 of neck portion 44 is curved so as to enhance the sealability to the packing of the cap.

Therefore, when the primary preformed piece 22 is blow-molded by biaxial orientation as described above, the body portion 40 is oriented. This orienting force does not effect the neck edge portion 45 due to the present of the thick short cylindrical neck portion 44, the neck edge portion 45 is maintained in it's original shape, thereby sufficiently obtaining the sealability and the openability of the caulked cap after molded as the bottle-shaped container 1.

According to the invention as apparent as described above, the uneven surface is formed to vary the thickness of the primary preformed piece 22. Therefore, the thickness of the bottle-shaped container blow-molded can be simply controlled, thereby enhancing the mechanical strength of the bottle-shaped container or forming the bottle-shaped container 1 in the desired pattern by the variation of the thickness.

The primary preformed piece 22 is formed in a thin tray shape, and the recess groove 42 or the projecting strip 43 is formed on the body portion 40 of the disc shape. Therefore, the preformed piece may be simply removed from the injection mold after the molding, and it is not necessary to form the injection mold in a special structure.

Then, a method of molding the bottle-shaped container with a wide port will now be described in detail.

Figure 9:
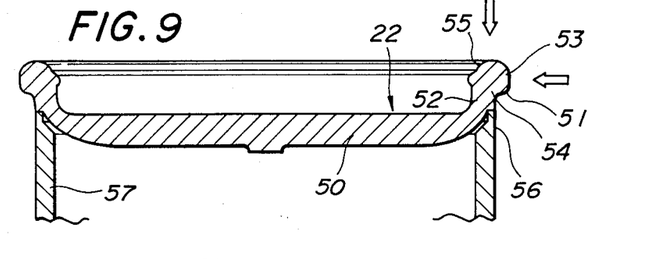
FIGS. 9 and 10 are sectional views for describing a method of molding a bottle-shaped container with a wide port of the invention.
Figure 10:
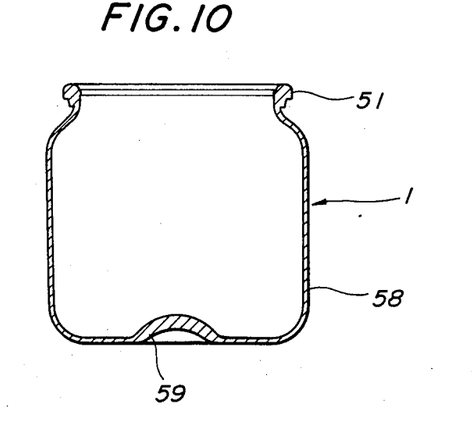

FIGS. 9 and 10 are explanatory views showing an embodiment of a method of molding a primary preformed piece of the invention.

A primary preformed piece 22 injection-molded from thermoplastic synthetic resin such as polyethylene terephthalate resin in constructed integrally with a short cylindrical neck portion 51 at the peripheral edge of a body portion 50 of disc shape.

The short cylindrical neck portion 51 is formed integrally with a neck edge portion 53 extending outwardly and upwardly of a thick short cylindrical neck portion 52, and the neck edge portion 53 is further formed with a curved outer lower peripheral surface 54 which is curved to enhance the openability of a caulked cap and a curved upper surface 55 which is curved to enhance the sealability to the packing (not shown) of the caulked cap. A stepped part 56 is peripherally formed on the outer periphery of the continuous part between the cylindrical neck portion 52 and the body portion 50.

The primary preformed piece 22 of such structure is heat treated at the cylindrical neck portion 51 by placing on a predetermined jig 57 prior to the biaxial orientation blow-molding.

This jig 57 is formed, for example, in a cylindrical shape to hold the primary preformed piece 22 in the state of supporting the stepped part 56 of the prefomed piece 22 by the upper end of the jig 57, to heat the cylindrical neck portion 51 from above and outside (as shown by an arrow in FIG. 9) and further to gradually cool the cylindrical neck portion 51, thereby crystallizing the portion.

The short cylindrical neck portion 51 is sufficiently heated by this heat treatment, and crystallized. When the body portion 50 is heated and crystallized together with the cylindrical neck portion 51 in this case, the orientation blow-molding of the body portion 50 cannot be achieved in the next step. Therefore, it is required to eliminate the crystallization of the body portion 50 in the heating step.

As means for preventing the occurrence of the crystallization of the body portion 50, it is preferable to prevent heating of the body portion 50 to the temperature at which the body portion 50 crystallizes.

As concrete means for blocking the heating of the body portion 50, it is preferable to utilize the jig 57 for blocking the radiation of the heating beam to the body portion 50 as shown in the embodiment.

In the embodiment shown, the jig 57 of cylindrical shape is indicated shown in contact at the upper end with the stepped part 56 as means for blocking the radiation of the heat beam to the body portion 50 of the preformed piece 22. However, in addition to the jig 57, a shield of a flat disc shape for shielding the heat beam from above may be disposed directly above the body portion 50 in the cylindrical neck portion 51.

The primary preformed piece 22 and particularly the entire cylindrical neck portion 51 of the preformed piece 22 is softened by the heat treatment for crystallizing the cylindrical neck portion 51 to become readily deformable by the action of gravity. Since the cylindrical neck portion 51 is placed on the jig 57, no deformation occurs due to gravity at the cylindrical neck portion 51. Thus, even if the cylindrical neck portion 51 is heat treated to be crystallized, no improper deformation occurs upon heat treating of the cylindrical neck portion 51. In this matter, the cylindrical neck portion 51 may be crystallized while accurately maintaining the dimensions of the cylindrical neck portion 51 at the time of injection molding.

After the cylindrical neck portion 51 is thus crystallized by the heat treatment as described above, the entire primary preformed piece 22 and particularly the body portion 50 of the preformed piece is heated to the orienting temperature, and is blow-molded by biaxial orientation to the bottle-shaped container 1.

More particularly, as apparent in FIG. 10, the bottle-shaped container 20 with a wide port is blow-molded at the body portion 50 of the primary preformed piece 22 to a body 58 and a bottom 59, and the cylindrical neck portion 51 remains at the cylindrical neck portion 51 of the primary preformed piece 22.

In the method of molding as described above, the cylindrical neck portion 51 of the primary preformed piece 22 is heat treated prior to the biaxial orientation blow-molding to crystallize in white color the cylindrical neck portion 51. Thus, high rigidity can be provided at the cylindrical neck portion 51, and the orienting force is not accordingly effected particularly to the neck edge portion 53 of the cylindrical neck portion 51 at the biaxial orientation blow-molding time of the body portion 50, the deformation such as strain of the neck edge portion 53 required for high dimensional accuracy might not occur, and sufficient mechanical durable strength can be achieved against the clamping force of the caulked cap, thereby holding the stable sealability to the caulked cap.

Since the cylindrical neck portion 52 of the neck edge portion 53 is formed to be thick, the orienting force effected on the body portion 50 can be absorbed even by the cylindrical neck portion 52, and the orienting force to be affected to the neck edge portion 53 can be entirely eliminated.

In case of heat treating the cylindrical neck portion 51, the jig 57 is used. Therefore, the heated portion is not limited to the cylindrical neck portion 51, thereby obviating the influence to the body portion 50. Consequently, the orientation of the body portion 50 is not obstructed, and the primary preformed piece 22 is held by the jig 57, thereby eliminating the collapse of the shape of the preformed piece 22.

Figure 11:
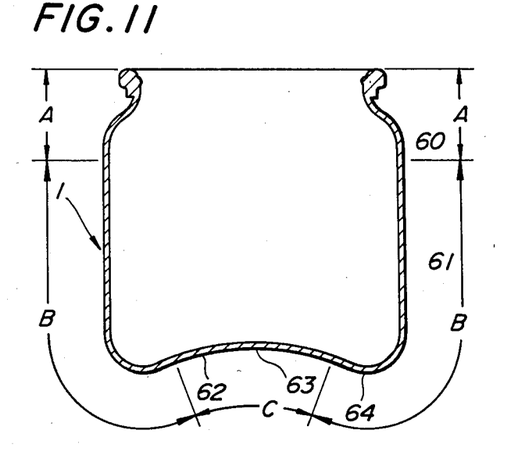
FIGS. 11 and 12 are sectional views for describing still another example of a method of molding a bottle-shaped container with a wide port of the invention.
Figure 12:
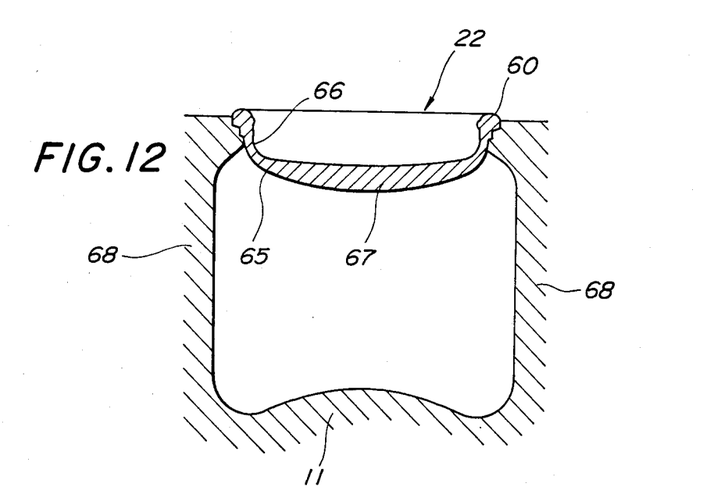

FIGS. 11 and 12 are explanatory views showing still another embodiment of a method of molding a bottle-shaped container of the invention.

When a bottle-shaped container is molded by thermoplastic resin such as polyethylene terephthalate resin, the molding is ready and the molding container having excellent quality can be provided. In order to provide heat resistance for the thermoplastic resin bottle-shaped container, there is means for blow-molding by biaxial orientation the synthetic resin by raising the mold temperature. When the mold temperature is, however, raised, a so-called "a sinkage" phenomenon occurs in the molded bottle-shaped container if the orienting magnification is not severely selected, a strain occurs in the molded container, thereby satisfactory molded bottle-shaped container.

More particularly, in order to improve the heat resistance, orienting crystal is grown, and the remaining strain should be removed. The higher the orienting magnification or the more the biaxial orientation is employed, the more the orienting crystal increases. Simultaneously, the strain at the orienting time increases.

Since the bottle-shaped container with a wide port has larger diameter to the depth, sufficient orienting magnification of the upper end of the body cannot be particularly obtained. Therefore, it is difficult to raise the mold temperature. In other words, in order to blow-mold by biaxial orientation the bottle-sahped container of thermoplastic synthetic resin having excellent heat resistance, various problems exist.

The method of molding the bottle-shaped container of the invention contemplates elimination of the above-described drawbacks, and comprises the steps of uniaxially orienting the upper portion of the body of the bottle-shaped container with a wide port, biaxially orienting the remaining part of the body and the peripheral end of the bottom, and further sequentially shifting from biaxial orientation to the uniaxial orientation at the bottom from the peripheral end to the central portion.

FIG. 11 shows a bottle-shaped container 1 with a wide port molded by this method. A cylindrical body 61 having a diameter slightly larger than that of a ring-shaped cylindrical neck portion 60 is arranged continuously to the cylindrical neck portion 60, a bottom 62 is continued to the lower end of the body 61, but the central part 63 of the bottom 62 is inwardly recessed. The upper part of the body 61 is set to a zone A, the remaining part from the central part to the lower part of the body 61 and the peripheral end 64 of the bottom 62 are set to a zone B, and the central part 63 of the bottom 62 is set to a zone C.

FIG. 12 shows a primary preformed piece 22 for molding a bottle-shaped container 1 with a wide port of the invention. The primary preformed piece 22 molded from thermoplastic synthetic resin is constructed integrally with a ring-shaped cylindrical neck portion 60 at the peripheral edge of a disc portion 65, the peripheral end 66 of the disc portion 65 is thin, and the central part 67 is, on the contrary, thick.

The above-described primary preformed piece 22 is secured to a predetermined blowing mold 68 and blow-molded by biaxial orientation.

The biaxial orientation blow-molding is executed as below.

An orienting pin contacts the center of the primary preformed piece 22 of a tray shape, to which the cylindrical neck portion 60 of the preformed piece is associated fixedly with the predetermined mold 68 to blow-mold the preformed piece. In this case, the bottle-shaped container 1 is uniaxially oriented mainly in the zone A to be oriented axially, biaxially oriented in the zone B to be oriented biaxially, and sequentially shifted from biaxial orientation to uniaxial orientation from the peripheral end 64 of the bottom 62 to the central part 63 in the zone C to be oriented.

In the zone A, the diameter is slightly larger than that of the cylindrical neck portion 60. Accordingly, sufficient biaxial orientation cannot be achieved, but molding strains increase to feasibly cause a so-called "sinkage" due to the strains. In this invention, the peripheral end 66 of the primary preformed piece 22 to become the zone A is reduced in thickness. Therefore, it is at least uniaxially oriented sufficiently to enable to perform the desired orientation.

In the zone B, the central part 67 of the primary preformed piece 22 is oriented, and biaxial orientation can be accordingly sufficiently performed.

In the zone C, the central part is not oriented, and the peripheral end 64 is biaxially oriented. Thus, molding strains are most feasibly produced. However, the central part 67 of the primary preformed piece 22 is increased in thickness, and the central part 63 of the bottom 62 to be molded is formed to be inwardly recessed. Therefore, the orientation can be sequentially reduced from the peripheral end 64 toward the central part 63, thereby eliminating the boundary between the oriented portion and the non-oriented portion. Thus, the occurrence of the strains can be prevented in advance.

According to the method of the invention as apparent from the abovementioned description, the upper part of the body 61 is mainly uniaxially oriented, thereby growing the orientating crystal of uniaxial direction without producing strains, and biaxial orientation is performed from the remaining part of the body 61 to the peripheral end 64 of the bottom 62, thereby growing the biaxially orienting crystal. Further, the bottom 62 is sequentially shifted from the biaxial orientation to the uniaxial orientation from the peripheral end 64 to the central part 63, thereby growing the desired orienting crystal.

Then, a method of heating the primary preformed piece of the invention will now be described in detail.

FIGS. 13 through 18 are explanatory views of the heating method of the invention.

In the method of blow-molding by biaxial orientation a bottle-shaped container, the primary preformed piece is heated to a predetermined temperature prior to the orientation blow-molding so as to readily orient the preformed piece. Since the primary preformed piece used for molding the conventional normal bottle-shaped container is formed in a bottomed cylindrical shape, the desired object can be achieved, for example, merely by rolling the preformed piece on a conveyor while heating the piece by a heater.

However, the primary preformed piece of the tray shape constructed as described above is placed on a predetermined jig, and the body portion is heated by a heater. For example, when the heat of the heated is uniformly emitted to the entire body portion of the disc shape, the temperature rising velocity of the central part of the body portion is much larger than that of the peripheral end of the body portion of the preformed piece. Thus, the distribution of heat about the entire primary preformed piece thus heated becomes very irregular.

Figure 13:
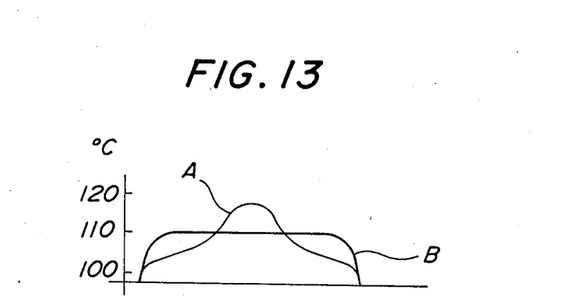
FIG. 13 is a graph showing the temperature distribution of the primary preformed piece.

FIG. 13 shows the temperature distribution of the primary preformed piece, wherein an abscissa axis is the position of raidal section of the primary preformed piece and an ordinate axis is the temperature. A curve (A) exhibits the temperature distribution characteristic of the case that the preformed piece is heated by the above-described means.

Here, the central part of the body portion is heated to the vicinity of 120° C., while the peripheral edge is heated to only approx. 100° C. Thus, the temperature distribution is very irregular, and effective orientation blow-molding cannot be achieved.

As described above, when the primary preformed piece is irregularly heated, the molded bottle-shaped container is formed in irregular thickness, desired thickness cannot be controlled, and further the characteristic by the orientation cannot be uniformly achieved as its drawbacks.

The heating method of the invention contemplates elimination of the above-described drawbacks, and can uniformly heat the body portion by radiation heating the vicinity of the peripheral edge as the boundary portion between the peripheral edge having large heat sink degree and the central part having small heat sink degree through a heater in the body portion of the preformed piece of the tray shape secured to the jig, thereby relatively rotating the jig and the heater to uniformly heat the body portion.

Figure 14:
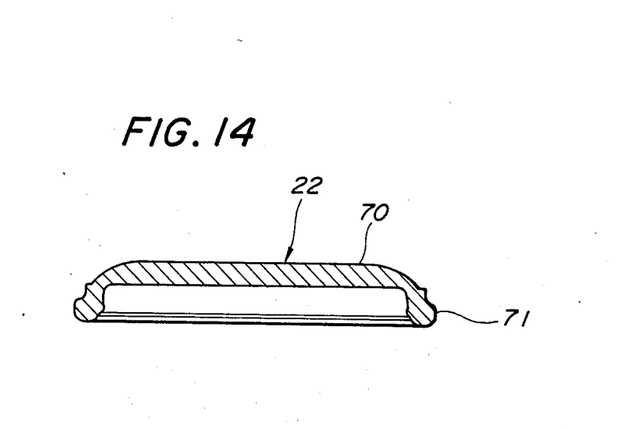
FIG. 14 is a sectional view of the preformed piece.

FIG. 14 shows a primary preformed piece 22 of thermoplastic synthetic resin to be heated of the invention. A short cylindrical neck portion 71 is constructed integrally with the peripheral edge of a body portion 70 of a disc shape.

Figure 15:
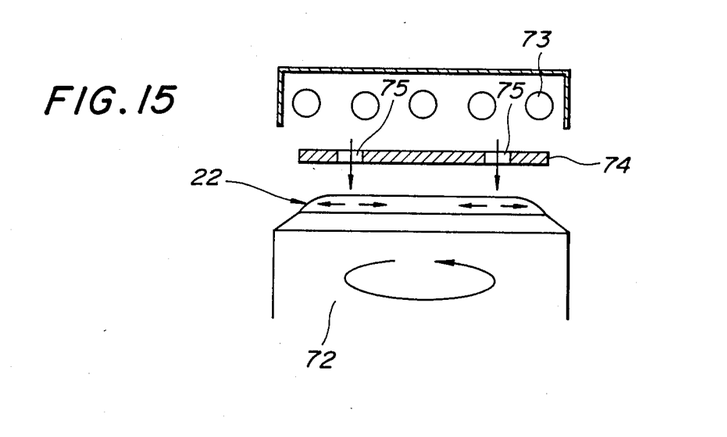
FIG. 15 is a sectional view of an embodiment of a heating method of the invention.

The primary preformed piece 22 is secured to a predetermined jig 72 in the state of engaging the cylindrical neck portion 71 in a laid attitude, a heater 72 having a hood oppositely to the body portion 70 of the preformed piece 22 engaged with the jig 72 is disposed at a predetermined interval, and the jig 72 and the heater 73 rotate relatively.

Figure 16:
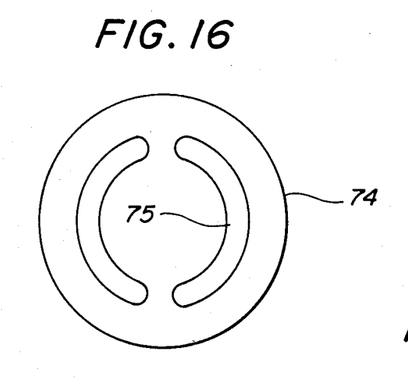
FIG. 16 is a plan view of a heat shielding plate.

A heater shielding plate 74 is disposed at a predetermined position between the jig 72 and the heater 73, and slits 75 of a predetermined width are formed substantially in a ring shape of a predetermined diameter at the heat shielding plate 74.

Therefore, the body portion 70 of the primary preformed piece 22 of the jig 72 is heated via radiation through the slits 75 by the heat of the heater 73 while relatively rotating the jig 72 and the heater 73, thereby heating the body portion 70.

The heat emitting position to the body portion 70 is the peripheral edge 76 having large heat sink degree of the body 70 and a peripheral end 78 substantially as the boundary part to the central part 77 having small heat sink degree so that the temperature rising velocity of the peripheral edge 76 is substantially equalized to that of the central part 77, thereby heating the entire body portion 70 substantially by uniform temperature.

Therefore, the mutual interval between the jig 72 and the heater 75 and the diameter of the slits 75 of the heat shielding plate 74 are set to heat, via radiation, the predetermined position of the body portion 70 by the heat from the heater 75, and the emitting heat quantity and the emitting time of the heater 75 are set corresponding to the predetermined temperature of the body portion 70.

Figure 17:
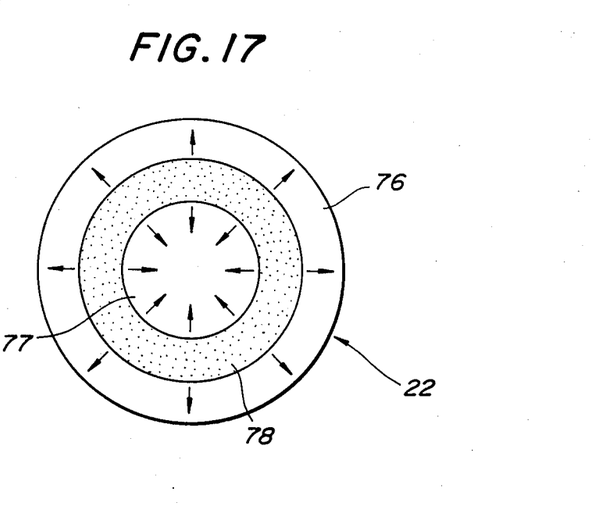
FIG. 17 is a plan view showing the temperature distribution state of the primary preformed piece.

FIG. 17 shows the heat transmitting state in the body portion 70. The heat of the heater 75 is uniformly emitted to the ring-shape peripheral end 78 along the slits 75 by the relative rotation of the heater 75 and the jig 72 along the circumferential direction, and the heat of the peripheral end 78 is, on one hand, radially transmitted and accumulated toward the central part 77, and, on the other hand, radially transmitted toward the peripheral end 76, and dissipated from the peripheral end.

Figure 18:
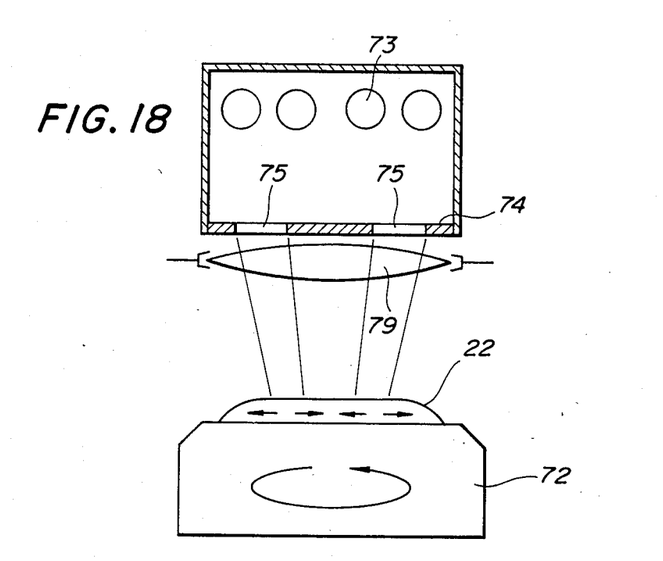
FIG. 18 is an explanatory view of other heating method of the invention.

FIG. 18 shows another example of the heating method of the invention. A convex lens 79 is arranged in coincidence with the axial center of the body portion 70 between the heat shielding plate 74 and the jig 72, thereby collecting the heat passed through the slits 75 to the predetermined peripheral end 78 of the body portion 70.

Therefore, the emitting position of the body portion 70 can be simply set.

According to the invention of the method of heating the primary preformed piece, the body portion of the primary preformed piece for blow-molding by biaxial orientation a bottle-shaped container with a wide port integrated with a short cylindrical neck portion at the peripheral edge of the body portion of a disc shape, can be heated to uniform and adequate temperature prior to the biaxial orientation blow-molding. Therefore, the bottle-shaped container with a wide port can be very simply and accurately blow-molded in a simple operation with a simple structure.

Figure 19:
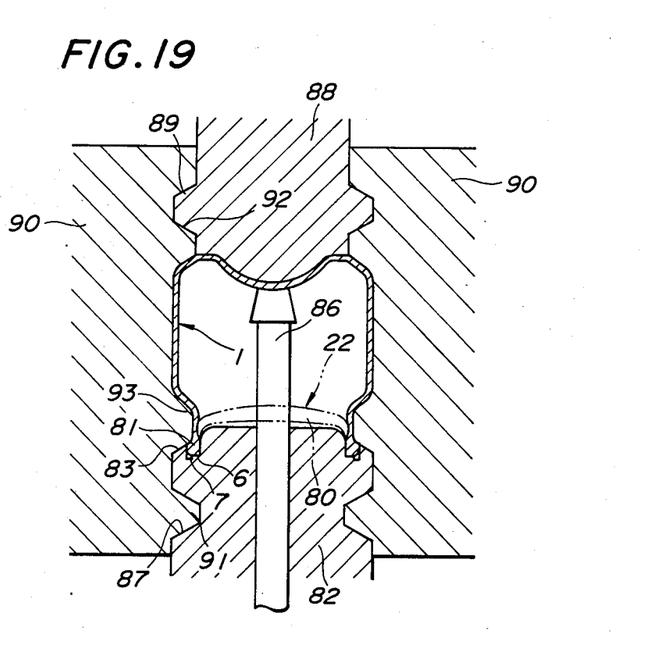
FIG. 19 is a sectional view of the molding machine.
Figure 20:
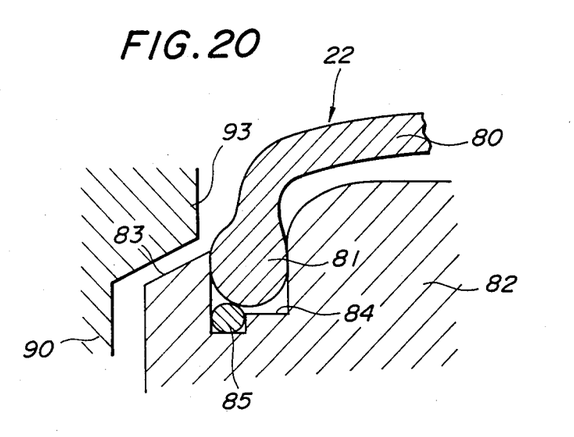
FIG. 20 is an enlarged sectional view of the essential part of the molding machine.
Figure 21:
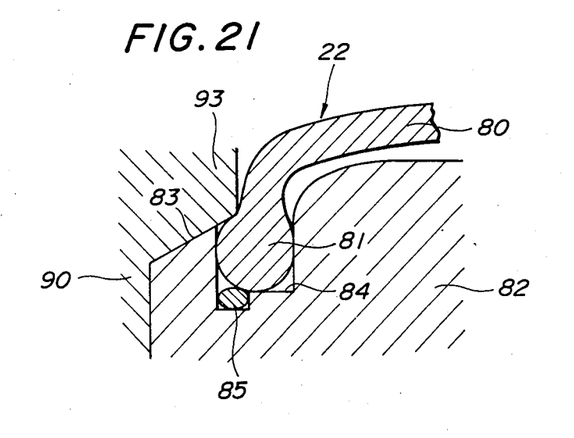
FIG. 21 is an enlarged sectional view of the essential part of the molding machine after closing the molds.

FIGS. 19 through 21 show a blowing mold for blow-molding a bottle-shaped container with a wide port from a primary preformed piece of the tray shape structure described above.

The mold for blow-molding, by biaxial orientation, the primary preformed piece of thermoplastic synthetic resin such as polyethylene terephthalate resin has a holding jig disposed oppositely to the preformed piece, a bottom mold disposed between the holding jig and the bottom mold so as not to open by another pressure element for supporting the holding jig at the blow-molding time.

When the primary preformed piece is formed in a bottomed cylindrical shape used for molding the conventional bottle-shaped container, the mold of the structure constructed as described above is sufficient.

However, a primary preformed piece of a tray shape in which a short cylindrical neck portion is peripherally formed at the peripheral edge of the body portion of disc shape is recently considered as the primary preformed piece for molding a so-called "bottle-shaped container with a wide port" having almost no difference between the diameter of the body and the diameter of the cylindrical neck portion of the bottle-shaped container. The primary preformed piece of this structure is largely oriented in the body portion by an orienting pin at the time of orientation blow-molding. In this case, the association of the molds become disadvantageously unstable by the increase in the orientation blowing pressure, or the molds tend toopen before the molding.

The blowing mold of the invention is formed to eliminate the above-described drawbacks and disadvantages, and constructed to be associated at the side mold with the holding jig and the bottom mold in the orienting direction of the orienting pin.

The primary preformed piece 22 for molding a bottle-shaped container 1 with a wide port is formed in a tray shape peripherally integrated with a short cylindrical neck portion 81 at the peripheral edge of a body portion 80 disc shape, and injection-molded from thermoplastic synthetic resin in thickness increased at the center of the body portion 80 as compared with the peripheral edge.

Then, an orientating jig 82 is formed in a tapered shape at the upper peripheral end 83, on which a holding groove 84 for engaging the cylindrical neck portion 81 of the primary preformed piece 22 is formed, and a sealing ring 85 is arranged therein.

An orienting pin 86 is associated longitudinally movably at the center of the holding jig 82 and penetrating the jig 82, and an engaging groove 87 is peripherally formed on the matching surface of the molds on the outer periphery of the holding jig 82.

A bottom mold 88 provided oppositely to the jig 82 is swelled at the lower center thereof to form the bottom of the bottle-shaped container 1, and an engaging projecting strip 89 is peripherally formed on the outer peripheral matching surfaces of the molds.

A side mold 90 for closing molds associated sidewisely with the holding jig 82 and the bottom mold 88 has an engaging peripheral strip 91 formed on the matching lower surface of the mold for engaging the engaging groove 87 of the jig 82, an engaging peripheral groove 82 formed on the matching upper surface of the mold for engaging the strip 89 of the bottom mold 88, and further a holding mold 93 to become the mold surface of the shoulder of the bottle-shaped container 1 for blocking the outer periphery of the open part of the groove 84 on the peripheral end 83 of tapered shape on the position corresponding to the peripheral end 83 of the jig 82.

In the structure described above, the cylindrical neck portion 82 is engaged within the holding groove 84 in the attitude that the primary preformed piece 22 is laid in the state that the orientating pin 86 of the holding jig 82 is not projected from the upper surface but retracted to the retarding position, thereby associating the preformed piece 22 with the jig 82.

Then, the bottom mold 88 is moved down to a predetermined position, and the side mold 90 is further associated sidewisely with the bottom mold 88 and the holding jig 82 to close the molds.

In this case, the engaging peripheral strip 91 of the side mold 90 is engaged with the engaging groove 87 of the jig 82, and the engaging peripheral groove 92 is engaged with the engaging projecting strip 89 of the bottom mold 88. Accordingly, the bottom mold 88 is always particularly disposed at a predetermined interval to the jig 82. Thus, the orienting pin 86 is moved forwardly, and even if strong orientation blowing pressure is applied to the primary preformed piece 22, the molds are not moved upwardly in a mold opening direction.

When the side mold 90 is closed, a holding mold 93 is placed on the peripheral end 83 of the jig 82 to block the outer peripheral side of the holding groove 84. Therefore, the primary preformed piece 22 becomes, at the cylindrical neck portion 81, impossible to be removed from the holding groove 84, the cylindrical neck portion 81 is completely pressed into the groove 84 and held in the groove 84, closely contacted with the sealing ring 85 to obtain the sealability at the blow-molding time and to fix the cylindrical neck portion 81 to the holding jig 82.

According to the invention as evident from the aforementioned description, the molding machine is constructed to elevationally engage the holding jig 82 and the bottom mold 88 through the side mold 90, and the jig 82 and the mold 88 are particularly engaged firmly in the orientating direction of the orienting pin 86. Therefore, even if large axial orientation blowing pressure is applied to the body portion 80 of the primary preformed piece 22 of a tray shape used for molding the bottle-shaped container 1 with a wide port, the molds are not opened.

What is claimed is:

1. A blow-molded bottle-shaped container of biaxially oriented thermoplastic synthetic resin with a wide port comprising:

a neck edge portion defining the edge of said wide port, said neck edge portion including an upper curved surface having a radius of curvature, a lower outer peripheral curved surface having a radius of curvature which is less than said radius of curvature of said upper curved surface, and an inner peripheral surface, wherein the centers of curvature of said upper curved surface and said lower outer peripheral curved surface lie within said neck edge portion;

a thin, bottomed cylindrical body formed by biaxial orientation blow molding;

a short thick cylindrical neck portion formed between said neck edge portion and said thin, bottomed cylindrical body, said short thick cylindrical neck portion having a radial thickness which is greater than the radial thickness of said thin bottomed cylindrical portion; said short thick cylindrical neck portion extending obliquely and radially inwardly from said inner peripheral surface of said cylindrical neck edge portion to define a cylindrical neck edge portion inner peripheral surface having a radius which is smaller than the radius of said inner peripheral surface of said neck edge portion, and said short thick cylindrical neck portion extending obliquely downwardly from said lower outer peripheral curved surface of said neck edge portion to define a cylindrical neck portion outer peripheral surface located radially inward of said lower outer peripheral surface of said neck edge portion;

wherein said cylindrical body is formed integrally with said short thick cylindrical neck portion and said cylindrical body abruptly bends and swells outwardly from a lower central portion of said short thick cylindrical neck portion;

wherein said upper curved surface of said neck edge portion is dimensioned so as to obtain strong sealing between a cap and the bottle, and said lower outer peripheral curved surface is dimensioned so as to enhance openability of the cap; and wherein said cylindrical neck portion prevents the transmission of stresses from the thin, bottomed cylindrical body to the neck edge portion, thereby preventing deformation of the neck edge portion during blow molding of the thin, bottomed cylindrical body.

2. The blow molded bottle-shaped container of biaxially oriented thermoplastic synthetic resin with a wide port of claim 1, wherein a peripheral groove shaped recess is formed on a boundary portion of an outer peripheral surface of said container between said short thick cylindrical neck portion and said body portion.

* * * * *